(12) United States Patent
Takano et al.

(10) Patent No.: US 7,152,422 B2
(45) Date of Patent: Dec. 26, 2006

(54) VAPOR COMPRESSION REFRIGERATOR

(75) Inventors: Yoshiaki Takano, Kosai (JP); Atsushi Inaba, Kariya (JP); Koichi Ban, Tokai (JP); Koji Takahashi, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/179,964

(22) Filed: Jul. 12, 2005

(65) Prior Publication Data

US 2006/0005557 A1    Jan. 12, 2006

(30) Foreign Application Priority Data

Jul. 12, 2004   (JP)   ............................. 2004-205089
Dec. 21, 2004   (JP)   ............................. 2004-369882

(51) Int. Cl.
F25B 27/00   (2006.01)

(52) U.S. Cl. ........................................ 62/238.6; 62/239

(58) Field of Classification Search ................ 62/238.6, 62/239, 323.1; 237/2
See application file for complete search history.

(56) References Cited

U.S. PATENT DOCUMENTS 5,291,941 A      3/1994  Enomoto et al.
5,333,679 A *    8/1994  Suzuki et al. .................. 165/43
6,370,898 B1 *   4/2002  Yamaguchi et al. ........... 62/244
6,675,595 B1 *   1/2004  Ohya ............................ 62/199
6,739,149 B1 *   5/2004  Kang et al. .................... 62/244
6,857,282 B1 *   2/2005  Shichiken et al. ............. 62/244
2004/0216483 A1* 11/2004 Inaba et al. .................... 62/498

FOREIGN PATENT DOCUMENTS

JP     2540738     7/1995
JP     08-216655   8/1996
JP     3237187     10/2001

* cited by examiner

Primary Examiner—Melvin Jones
(74) Attorney, Agent, or Firm—Harness, Dickey & Pierce, PLC

(57)    ABSTRACT

A vapor compression refrigerator having a refrigeration cycle (200) is disclosed. In a Rankine cycle (300), a refrigerant is circulated through a pump (310), a heater (320), an expander (330) and a condenser (220) in that order, and power is recovered by the expander 330 due to the expansion of the refrigerant from the heater (320). In a host gas cycle (500), on the other hand, the inlet of the compressor (210) can be connected from a point between the pump (310) and the heater (320) by a switching path (510) having a first restricting portion (510), the refrigerant is circulated by the compressor (210) through the heater (320) and the switching path (510) in that order, and the heater (320) exhibits the function of heating a heat generating device (10).

13 Claims, 9 Drawing Sheets

VAPOR COMPRESSION REFRIGERATOR

BACKGROUND OF THE INVENTION

1. Field of the Invention

The present invention relates to a vapor compression refrigerator having a Rankine cycle, for recovering power, utilizing the waste heat of a heat generating device and a hot-gas cycle capable of heating the heat generating device, effectively applicable to an automotive climate control system mounted on a vehicle and having an auxiliary heating function adapted to help increase the engine water temperature to secure a comfortable temperature of the passenger compartment within a short period of time, from the time of starting the heating operation, when the engine water temperature is low.

2. Description of the Related Art

In a conventional vapor compression refrigerator disclosed in Japanese Patent Publication No. 2540738, for example, a component part (condenser) of a refrigeration cycle is shared to form a Rankine cycle, the waste heat of the vehicle engine (heat generating device) is recovered as power by an expander doubling as a compressor and the power thus recovered is applied to the engine.

The engine waste heat is supplied to the heater in a heater circuit and, thus, is used as a heat source for the operation of heating the passenger compartment (hereinafter referred to simply as the heating operation).

In the hybrid car of which the ownership has recently begun to increase, rate of operation of the engine at a low vehicle speed is set to a low level. Thus, heat (waste heat) generated by the engine is very small in amount. Especially in winter, a sufficient amount of heat cannot be supplied as a heat source for the heater. In the hybrid car, therefore, the engine is required to run to secure the heat source for the heater even while the vehicle is driven at low speed at the sacrifice of a low fuel consumption efficiency.

In ordinary vehicles, on the other hand, the recently improved engine efficiency has reduced the waste heat generated by cooling the engine, thereby posing a problem, as in the hybrid car, that the heat source for the heater is insufficient. To compensate for the heat source shortage, ordinary vehicles carry an exclusive PTC heater, for example, in spite of an increased cost.

In view of this, there has been proposed a system in which the compressor, the condenser and the heater in the refrigeration cycle and the Rankine cycle are utilized, and by adding a restricting portion between the heater and the condenser, a heat pump cycle (through the compressor, the heater, the restricting portion and the condenser in that order) is formed so that the condenser exhibits the heat absorption function while the engine warm-up is promoted by the heating function of the heater.

In the case where the atmospheric temperature is very low (−10° C. or lower, for example), however, the heat absorption of the condenser from the atmosphere as a heat pump cycle requires that the temperature of the refrigerant flowing in the condenser must be reduced below the atmospheric temperature. That is to say, the refrigerant pressure is required to be reduced, so that the pressure difference between the suction side and the discharge side of the compressor is greatly increased, thereby considerably reducing the refrigerant flow rate. This poses the problem that the heating ability of the heater cannot be sufficiently exhibited.

In a conventional vehicle carrying a water-cooled engine, on the other hand, the engine cooling water is used as a heat source of the heating operation. In the case where the heating operation is started while the cooling water temperature is still low at the time of starting the engine, however, air not sufficiently heated would be blown into the passenger compartment and the occupants would feel uncomfortable. In the conventional automotive climate control system, therefore, the operation of the blower and the refrigeration cycle is suspended to prevent the cold air from being blown out (engine warm-up control operation) while the cooling water is not higher than a predetermined temperature.

An electric vehicle incapable of using the engine cooling water for the heating operation, on the other hand, is often equipped with a heat pump air conditioning system as described in Japanese Unexamined Patent Publication No. 8-216655. In such a system, for example, the heating operation is performed using the hot water heated by a high-pressure (high-temperature) refrigerant as a heat source (or using a high-pressure refrigerant as a heat source). Also, in this electric vehicle, as in the engine-driven vehicle, the engine warm-up control operation is performed by preventing the cold air from being blown out before the heat source (hot water, refrigerant) reaches a predetermined temperature.

In a system using a heat pump cycle disclosed in Japanese Unexamined Patent Publication No. 8-216655, as shown in FIG. 13, during the operation of cooling the passenger compartment (hereinafter referred to simply as the cooling operation), the refrigerant is discharged from a refrigerant compressor 1 and by switching a solenoid valve, introduced into the refrigerant compressor 1 again through a water-refrigerant heat exchanger 2, an outer heat exchanger (acting as a condenser) 4 and an inner heat exchanger (evaporator) 6 in that order. During the heating operation, on the other hand, the solenoid valve is switched so that the refrigerant discharged from the refrigerant compressor 1 is sucked into the refrigerant compressor 1 again through the water-refrigerant heat exchanger 2 and the outer heat exchanger (acting as an evaporator) 4 in that order. Further, during the dehumidifying operation, the solenoid valve is so switched that the refrigerant discharged from the refrigerant compressor 1 is sucked again into the refrigerant compressor 1 through the water-refrigerant heat exchanger 2, the outer heat exchanger (acting as a condenser) 4 and the inner heat exchanger (evaporator) 6 in that order. In this way, with the system using the heat pump cycle, the heat pump is operated using the water-refrigerant heat exchanger and the condenser or the evaporator in all operation modes. Reference numeral 13 designates a combustion heater used as an auxiliary heater when the atmospheric temperature is so low that the water-refrigerant heat exchanger 2 alone cannot sufficiently heat the water. Numeral 10 designates a heater core using hot water.

In the heat-pump type air conditioning system mounted on the electric vehicle described in Japanese Unexamined Patent Publication No. 8-216655, however, the amount of heat absorbed into the outer heat exchanger (acting as an evaporator) is decreased with a decrease in the atmospheric temperature and, therefore, the high-pressure refrigerant drops in temperature. The system using the heat pump cycle, therefore, cannot be used in an environment such as cold areas in the winter season.

Japanese Patent Publication No. 3237187, on the other hand, discloses an automotive climate control system using a hot gas heater system that can work even in cold areas. In the cooling operation, as shown in FIG. 14, the solenoid valve of this hot gas heater system is switched so that the refrigerant discharged from the refrigerant compressor 1, after cooling the air through the outer heat exchanger (condenser) 4 and the inner heat exchanger (evaporator) 6, is sucked into the refrigerant compressor 1. During the heating operation, on the other hand, the solenoid valve is switched so that the refrigerant discharged from the refrigerant compressor 1, by bypassing the outer heat exchanger 4, directly enters the inner heat exchanger (acting as a heat-emitter) 6, and after heating the air, is sucked into the refrigerant compressor 1. This inner heat exchanger 6 is arranged in the air flow upstream of the heater core 10 using the cooling water of the engine 11 and works as an auxiliary heating function.

In the conventional automotive climate control system using a hot-gas heater system described above, however, the inner heat exchanger 6 functioning as an evaporator providing a low-pressure-side heat absorber during the cooling operation functions as a high-pressure-side heat emitter during the heating operation. The condensed water, the frost, etc. generated in the inner heat exchanger 6 during the cooling operation is heated and evaporated during the heating operation, and the resultant vapor is liable to be blown against and fog the window glass.

SUMMARY OF THE INVENTION

In view of the problems described above, a first object of the invention is to provide a vapor compression refrigerator having the Rankine cycle making the most of the waste heat of a heat generating device, in which even in the case where the atmospheric temperature is very low, the heat generating device can be heated to compensate for the insufficient ability of other devices operated with the waste heat.

A second object of the invention is to provide an automotive climate control system in which an auxiliary heating function works in winter or cold areas while at the same time preventing the frosting of the window glass.

According to one aspect of the invention, there is provided a vapor compression refrigerator wherein the refrigerant is sucked and compressed by a compressor and circulated through a condenser, a pressure reducing device and an evaporator in that order while the evaporator exhibits the refrigeration function, comprising a Rankine cycle for circulating the refrigerant through a pump for discharging the refrigerant, a heater for heating the refrigerant with the waste heat of a heat generating device as a heat source, an expander and a condenser in that order, and recovering power by the expansion of the refrigerant in the expander from the heater, and a hot gas cycle including a switching flow path having a first restricting portion capable of connecting from a point between the pump and the heater to the suction side of the compressor for circulating the refrigerant through the heater and the switching flow path in that order, the heater exhibiting the function of heating the heat generating device.

In the case where the refrigeration function is not required and a sufficient amount of heat (waste heat) can be obtained from the heat generating device, the Rankine cycle is activated, so that power can be recovered by the expander and the waste heat of the heat generating device can be effectively utilized. In the case where the heat generating device generates only a small amount of heat (waste heat), the hot gas cycle is activated so that even in the case where the atmospheric temperature is very low, the heat generating device can be heated indirectly through the heater thereby to improve the engine warm-up performance of the heat generating device.

Preferably, the heat generating device is a heat engine.

The vapor compression refrigerator according to this invention further comprises a heating operation device using the waste heat of the heat generating device as a heat source.

In the case where the heat (waste heat) generated by the heat generating device is so small that the heating operation device cannot exhibit a sufficient ability using the heat generating device as a heat source, the hot gas cycle is activated to heat the heat generating device indirectly thereby to compensate for the insufficient ability of the heating operation device.

According to this invention, the heater is arranged in the refrigerant path connecting the compressor and the condenser.

In the case where the heat generating device generates only a small amount of heat and the evaporator exhibits the refrigeration function, therefore, the high-temperature high-pressure refrigerant discharged from the compressor can be supplied to the heater, and therefore the heat generating device can be heated indirectly by the heater thereby to improve the engine warm-up performance of the heat generating device.

Further, as the refrigerant is cooled (heat radiated) by the heater as well as by the condenser, the refrigerant pressure can be reduced for a reduced power of the compressor.

According to this invention, the compressor functions as an expander when the refrigerant flowing out from the heater flows into the compressor.

As a result, the compressor and the expander can be combined into a compact fluid machine as an expander-integrated compressor.

According to this invention, the condenser includes a gas-liquid separator for separating the refrigerant flowing out from the condenser into a gas-phase refrigerant and a liquid-phase refrigerant and a liquid refrigerant super-cooler for supercooling the liquid-phase refrigerant flowing out from the gas-liquid separator while the Rankine cycle is working.

As a result, the liquid-phase refrigerant flowing out from the condenser and separated by the gas-liquid separator while the Rankine cycle is working can be supplied to the pump after being further cooled by the liquid refrigerant super-cooler. Even in the case where the pressure is decreased (to a negative pressure) when the pump sucks in the refrigerant, therefore, the refrigerant is prevented from being boiled and gasified. Thus, the damage to the pump and the reduction in pump efficiency by cavitation is prevented.

The vapor compression refrigerator according to this invention further comprises an accumulator for separating the refrigerant into a gas-phase refrigerant and a liquid-phase refrigerant at the inlet of the compressor and supplying the gas-phase refrigerant to the compressor while the hot gas cycle is working.

As a result, the refrigerant in liquid phase is prevented from being compressed in the compressor.

According to this invention, the accumulator is arranged displaced from the refrigerant path while the evaporator exhibits the refrigeration function.

As a result, the refrigerant flow pressure loss is reduced while the evaporator exhibits the refrigeration function.

The vapor compression refrigerator according to this invention further comprises a heat pump cycle including a bypass having a second restricting portion whereby the pump can be bypassed, the refrigerant is circulated through the heater, the bypass and the condenser in that order by the compressor, the condenser exhibits the heat-absorbing function and the heater exhibits the function of heating the heat generating device.

In the case where the heat generating device generates only a small amount of heat (waste heat), therefore, the heat pump cycle is activated so that the heat generating device can be heated indirectly through the heater for an improved engine warm-up performance of the heat generating device.

In the heat pump cycle, the heating ability of the heater cannot be sufficiently exhibited, as described above with reference to the prior art, in the case where the atmospheric temperature is very low as in the hot gas cycle. As long as the atmospheric temperature permits the condenser to absorb heat, however, the heat thus absorbed and the heat corresponding to the work done by the compressor (the heat corresponding to the work done by the compressor in the hot gas cycle) can be radiated by the heater, and therefore a heating ability higher than in the hot gas cycle can be exhibited.

The vapor compression refrigerator according to the invention is effectively used for a hybrid car having a heat engine as a heat generating device and a drive motor as a drive power source.

According to another aspect of the invention, there is provided an automotive climate control system comprising a closed refrigerant circuit for conducting the normal refrigeration cycle and a closed cooling water circuit for performing the heating operation using the engine cooling water, wherein the closed refrigerant circuit includes a bypass leading to a path connecting a low-pressure-side heat absorber and an accumulator from the inlet of a switching means circumventing a high-pressure-side heat emitter and a water-refrigerant heat exchanger arranged upstream of the main heater in the cooling water flow between the engine and the main heater for exchanging heat between the refrigerant discharged from a compressor and the cooling water discharged from the engine, wherein the refrigerant is supplied only to the water-refrigerant heat exchanger using the bypass while no refrigerant is supplied to the low-pressure-side heat absorber during the heating (hot gas) operation. As a result, the auxiliary heating function is exhibited to promote the temperature increase of the engine cooling water when the atmospheric temperature and thus shorten the time before the passenger compartment reaches a comfortable temperature. At the same time, the condensed water of the low-pressure-side heat absorber is evaporated and the window glass is prevented from being fogged.

In the automotive climate control system according to this invention, the water-refrigerant heat exchanger may be arranged downstream instead of upstream of the main heater with equal operation effect.

In the automotive climate control system according to this invention, the compressor may be driven by an engine.

The present invention may be more fully understood from the description of preferred embodiments of the invention, as set forth below, together with the accompanying drawings.

DESCRIPTION OF THE PREFERRED EMBODIMENTS

First Embodiment

Figure 1:
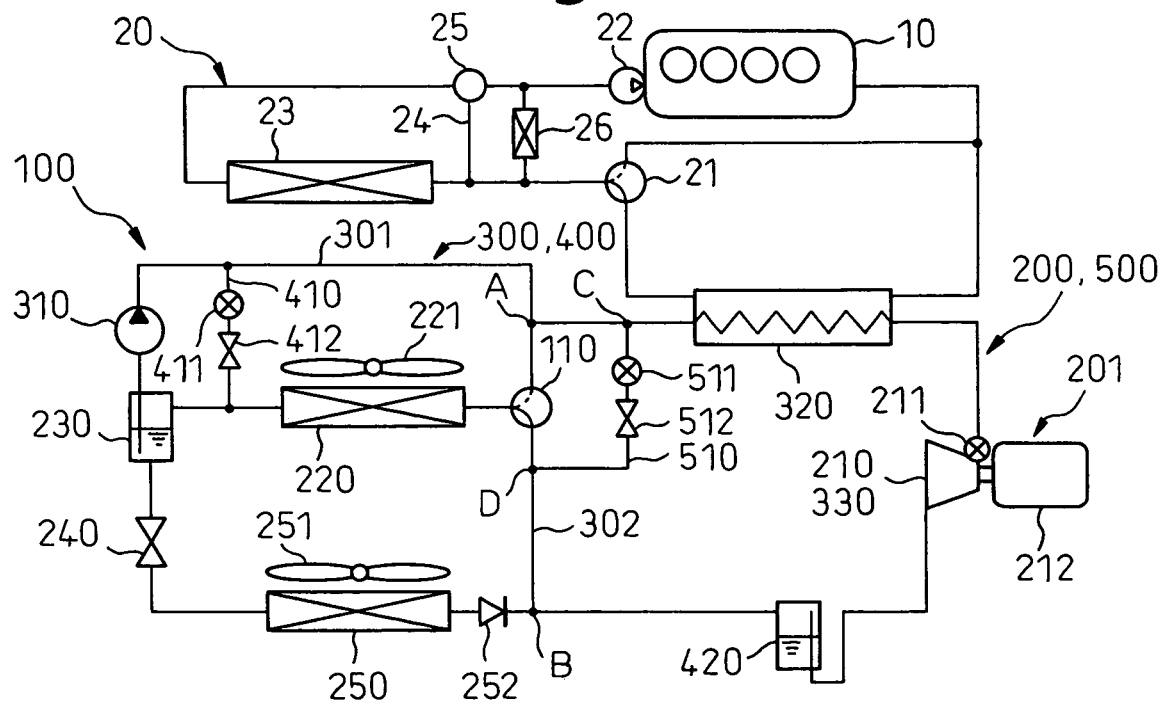
FIG. 1 is a schematic diagram showing a vapor compression refrigerator according to a first embodiment of the invention.

This embodiment represents an application of a vapor compression refrigerator 100 according to the invention to a climate control system of a hybrid car having a water-cooled engine (heat engine or internal combustion engine) 10 as a drive power source and a drive motor. FIG. 1 is a schematic diagram showing the vapor compression refrigerator 100 according to the first embodiment. According to this invention, the engine 10 corresponds to a heat generating device producing waste heat for temperature control.

The vapor compression refrigerator 100, as shown in FIG. 1, has built therein a Rankine cycle 300, a heat pump cycle 400 and a hot gas cycle 500 based on the well-known refrigeration cycle 200. The cycles 200, 300, 400 and 500 are explained in that order below.

First, in the refrigeration cycle 200, cold and heat are used for the air-conditioning operation by moving the heat on low-temperature side to high-temperature side. The refrigeration cycle 200 is configured of a compressor 210, a condenser 220, a gas-liquid separator 230, a pressure reducing device 240, an evaporator 250, etc. connected in a ring.

The compressor 210 is a fluid machine for sucking and compressing the refrigerant under high pressure at high temperature and, in the case under consideration, makes up an expander-integrated compressor 201 doubling as an expander 330 used for the Rankine cycle. The compressor 210 and the expander 330 have a basic structure of scroll type and have a control valve 211 on high-pressure side of the refrigerant flow. The control valve 211 is for switching between the expander 330 and the compressor 210 of the expander-integrated compressor 201. During the operation as a compressor 210 (forward rotation), the control valve 211 functions as a discharge valve (i.e. a check valve), and during the operation as an expander 330 (reverse rotation), functions as a valve to open the high-pressure-side refrigerant path. The control valve 211 is controlled by a control unit not shown. Also, the compressor 210 and the expander 330 are connected with a rotary electric machine 212 having dual functions of generator and motor and controlled by a control unit not shown.

A condenser 220 for liquefying by cooling and condensing the refrigerant compressed under high pressure at high temperature is arranged on the refrigerant discharge side of the compressor 210. A fan 221 is for supplying the cool air (outdoor air) to the condenser 220.

The gas-liquid separator 230 is a receiver to separate the refrigerant condensed by the condenser 220 into a gas-phase refrigerant and a liquid-phase refrigerant and produce a liquid-phase refrigerant. The pressure reducing device 240 is a pressure reducing means to expand by reducing the pressure of the liquid-phase refrigerant separated in the gas-liquid separator 230. According to this embodiment, a temperature-type expansion valve is employed in which the refrigerant is decompressed isoenthalpically while at the same time controlling the restricting portion opening degree to secure a predetermined overheating degree of the refrigerant sucked into the compressor 210.

The evaporator 250 is a heat exchanger in which the refrigerant reduced in pressure by the pressure reducing device 240 is evaporated to perform the heat absorbing operation. Thus, the outdoor air (atmospheric air) or the indoor air (internal air) supplied by the fan 251 is cooled. A check valve 252 allowing the refrigerant to flow only toward the compressor 210 from the evaporator 250 is arranged at the refrigerant outlet of the evaporator 250.

The Rankine cycle 300, which shares the condenser 220 with the refrigeration cycle 200, is formed of a first bypass 301 extending from the gas-liquid separator 230 and connected to a point (point A) between the condenser 220 and the expander 330 in such a manner as to bypass the condenser 220, and a second bypass 302 extending from a point (point B) between the expander 330 and the check valve 252 and connected to a point between the condenser 220 and point A.

Specifically, the first bypass 301 has a liquid pump 310 for circulating the liquid-phase refrigerant separated by the gas-liquid separator 230. The liquid pump 310 is electrically operated and controlled by a control unit not shown. Also, a heater 320 is interposed between point A and the expander 330.

The heater 320 is a heat exchanger for heating the refrigerant by exchanging heat between the refrigerant sent from the liquid pump 310 and the engine cooling water (hot water) of the hot water circuit 20 in the engine 10. The engine cooling water flowing out of the engine 10 is switched by a three-way valve 21 between the case where the engine cooling water is circulated in the heater 320 and the case where it is not. The three-way valve 21 switches the flow path through a control unit not shown.

Incidentally, a water pump 22 is for circulating the engine cooling water in the hot water circuit 20 (for example, a mechanical pump driven by the engine 10 or an electrically-operated pump driven by a motor). A radiator 23 is a heat exchanger for cooling the engine cooling water by exchanging heat between the engine cooling water and the atmosphere. A radiator bypass 24 is a path through which the engine cooling water flows by circumventing the radiator 23. A thermostat 25 is a flow rate control valve for adjusting the amount of the cooling water supplied to the radiator bypass 24 and the radiator 23. A heater core (corresponding to the heating operation device according to the invention) 26 for the climate control system to heat the air-conditioning air is arranged in the hot water circuit 20 as a heat source to heat the engine cooling water.

A cycle switching valve 110 making up a cycle switching means is arranged at the condenser 220-side join of the second bypass 302. The cycle switching valve 110 is a three-way valve to switch between the refrigeration cycle 200, the Rankine cycle 300 and the heat pump cycle 400 described later, by opening the path including point A or the path including point B from the condenser 220. This cycle switching valve 110 is controlled by a control unit not shown.

The liquid pump 310, the first bypass 301, the heater 320, the expander 330, the second bypass 302, the condenser 220, etc. make up the Rankine cycle 300 to recover the driving force of the expander 330 from the waste heat of the engine 10.

The heat pump cycle 400 is formed of a liquid pump bypass 410 based on the Rankine cycle 300.

The liquid pump bypass 410 forms a path bypassing the liquid pump 310, and includes an on-off valve 411 to open or close the path and a restriction (corresponding to the second restricting portion according to the invention) 412 with an opening degree fixed at a predetermined value. The on-off valve 411 is controlled by a control unit not shown. Between point B and the compressor 210, an accumulator 420 is arranged to separate the refrigerant in the cycle into a gas-phase refrigerant and a liquid-phase refrigerant and supply only the gas-phase refrigerant to the compressor 210.

The compressor 210, the heater 320, the liquid pump bypass 410, the restricting portion 412, the condenser 220, the accumulator 420, etc. make up a heat pump cycle 400. In the heat pump cycle 400, the condenser 220 functions as a heat exchanger to absorb heat from the atmosphere, and the heater 320 functions as a heating heat exchanger to heat the engine cooling water with a high-temperature high-pressure refrigerant from the compressor 210.

Further, the hot gas cycle 500 is formed of a switching path 510 utilizing a part of the heat pump cycle 400.

Specifically, the switching path 510 provides a path connected from a point (point C) between the liquid pump 310 and the heater 320 to the suction side (point D) of the compressor 210, and includes an on-off valve 511 to open and close the path and a restricting portion (corresponding to the first restricting portion according to the invention) 512 with an opening degree fixed at a predetermined value. The on-off valve 511 is controlled by a control unit not shown.

The compressor 210, the heater 320, the switching path 510, the restricting portion 512, the accumulator 420, etc. make up the hot gas cycle 500.

Next, the operation and effects of the vapor compression refrigerator 100 according to this embodiment are explained with reference to FIGS. 2 to 6.

Figure 2:
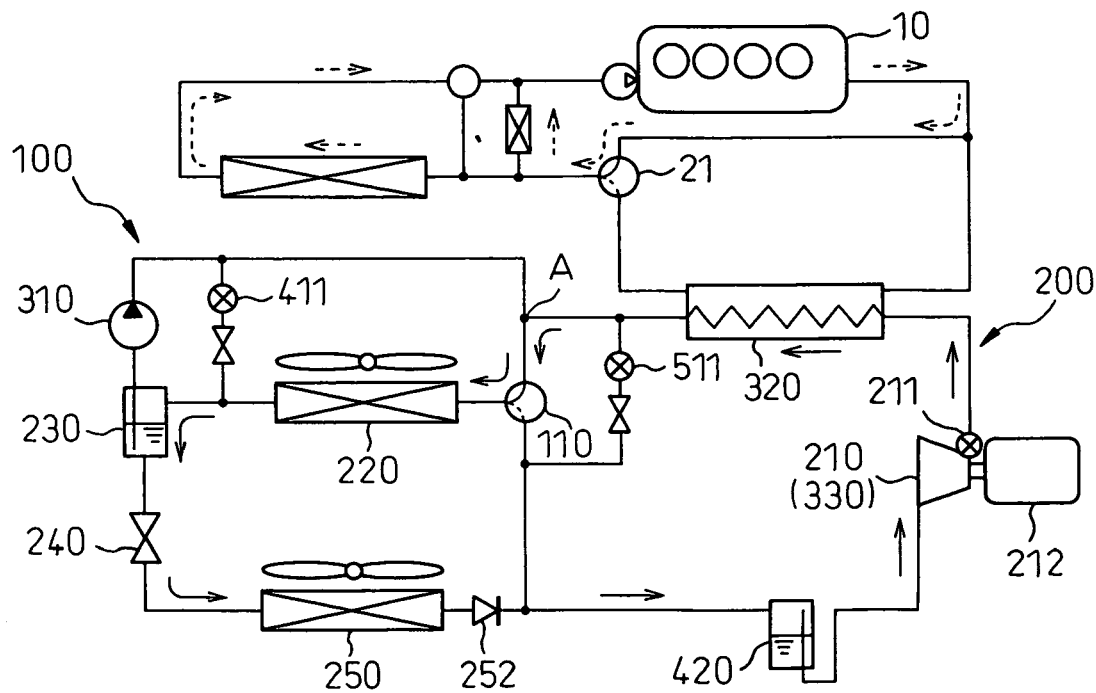
FIG. 2 is a schematic diagram showing the directions in which the engine cooling water and the refrigerant flow in cooler mode in FIG. 1.

1. Cooler Mode (FIG. 2)

In this operation mode, the refrigeration cycle 200 is activated so that the refrigerant is cooled by the condenser 220 while permitting the evaporator 250 to exhibit the refrigeration ability. According to this embodiment, the refrigeration cycle 200 is operated only to use the cold generated thereby, i.e. only for the cooling operation and the dehumidifying operation using the heat absorbing function of the refrigeration cycle 200. Thus, the heating operation using the heat generated by the condenser 220 is not performed. Also, during the heating operation, however, the refrigeration cycle 200 operates in the same way as in the cooling operation and in the dehumidifying operation.

Specifically, a control unit not shown connects the condenser 220 to the path including point A by switching the cycle switch valve 110. At the same time, the three-way valve 21 is switched so that the engine cooling water bypasses the heater 320 and the control valve 211 functions as a discharge valve. At the same time, the liquid pump 310 is stopped and the on-off valves 411, 511 closed. Then, the rotary electric machine 212 is operated as a motor (rotated in the forward direction), with the result that the expander-integrated compressor 201 operates as a compressor (210).

In the process, the refrigerant is circulated through the compressor 210, the heater 320, the cycle switch valve 110, the condenser 220, the gas-liquid separator 230, the pressure reducing device 240, the evaporator 250, the check valve 252, the accumulator 420 and the compressor 210 in that order. As the engine cooling water is not circulated through the heater 320, the refrigerant is not heated by the heater 320 which functions only as a refrigerant path.

The refrigerant that has increased in both temperature and pressure by being compressed through the compressor 210 is cooled and condensed by the atmospheric air in the condenser 220, reduced in pressure by the pressure reducing device 240, is evaporated in the evaporator 250 by absorbing heat from the air blown into the compartments, and the resultant evaporated gas-phase refrigerant is returned again to the compressor 210.

Figure 3:
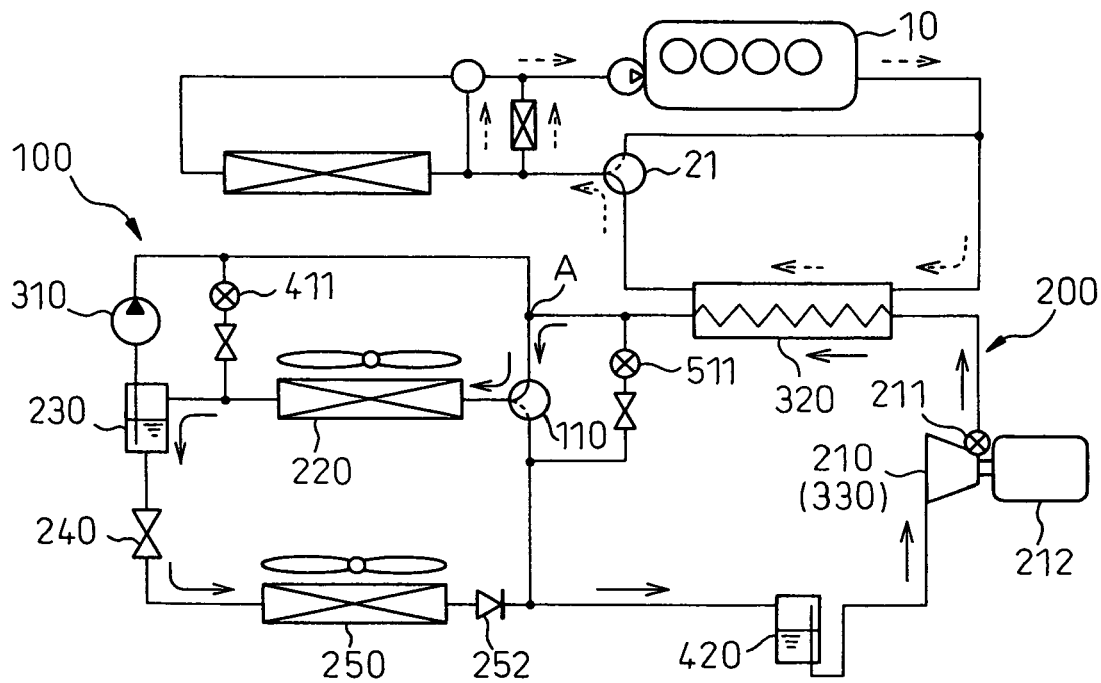
FIG. 3 is a schematic diagram showing the directions in which the engine cooling water and the refrigerant flow in cooler plus warm-up mode in FIG. 1.

2. Cooler Plus Warm-Up Mode (FIG. 3)

In this operation mode, the engine cooling water as low in temperature as immediately after starting the engine 10 is positively heated by executing the cooler mode by the refrigeration cycle 200.

Specifically, the three-way valve 21 is switched in the cooler mode described above by a control unit not shown so that the engine cooling water flows through the heater 320. In the process, the temperature of the engine cooling water is lower than that of the high-temperature high-pressure refrigerant compressed by the compressor 210. Thus, heat is exchanged between the refrigerant and the engine cooling water in the heater 320 thereby to heat the engine cooling water. In other words, the refrigerant is cooled in the heater 320. In the cooler plus warm-up mode, therefore, the heater 320 functions as a heat emitter to radiate the heat of the refrigerant to the engine cooling water (engine 10) (engine cooling water heating function).

Figure 4:
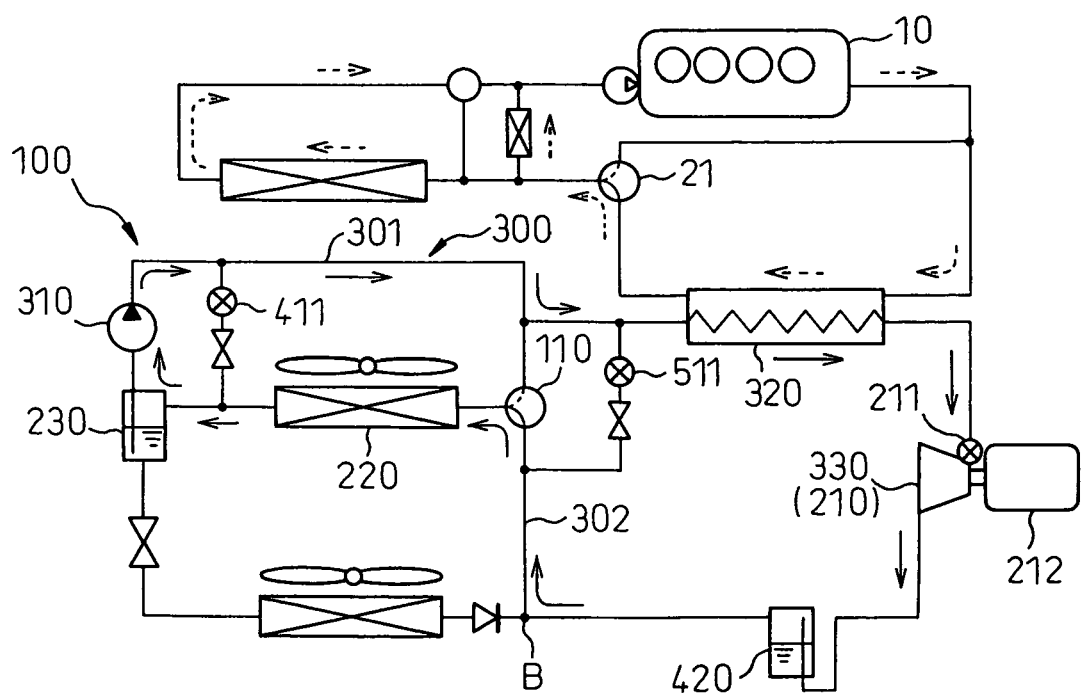
FIG. 4 is a schematic diagram showing the directions in which the engine cooling water and the refrigerant flow in Rankine power generation mode in FIG. 1.

3. Rankine Power Generation Mode (FIG. 4)

In this operation mode, when the engine water temperature increases sufficiently beyond a predetermined temperature, the Rankine cycle 300 is started to recover the waste heat of the engine 10 as energy usable for other devices.

Specifically, the cycle switch valve 110 is switched by a control unit not shown to connect the condenser 220 and the flow path including point B (second bypass 302). At the same time, the three-way valve 21 is switched to open the control valve 211 and allow the engine cooling water to flow through the heater 320. Thus, the liquid pump 310 is started to close the on-off valves 411, 511. Then, the rotary electric machine 212 is operated as a generator.

In the process, the refrigerant is circulated through the gas-liquid separator 230, the first bypass 301, the liquid pump 310, the heater 320, the expander 330, the accumulator 420, the second bypass 302, the cycle switch valve 110, the condenser 220 and the gas-liquid separator 230 in that order.

The vapor refrigerant overheated by the heater 320 flows into the expander 330. The overheated vapor refrigerant that has thus flowed into the expander 330 is expanded entropically in the expander 330 while reducing the enthalpy thereof progressively. As a result, the expander 330 supplies the mechanical energy corresponding to the reduced enthalpy to the rotary electric machine 212. Specifically, the expander 330 is rotationally driven by the expansion of the overheated vapor refrigerant, and the resulting drive force starts the rotary electric machine (generator) 212 (rotated in reverse direction). The power generated by the rotary electric machine 212 is stored in a storage battery such as a battery or a capacitor, and also used for the operation of other devices.

The refrigerant that has flowed out of the expander 330 is cooled and condensed by the condenser 220, and stored in the gas-liquid separator 230. The liquid-phase refrigerant in the gas-liquid separator 230 is sent to the heater 320 by the liquid pump 310. The liquid pump 310 sends the liquid-phase refrigerant to the heater 320 under such a pressure that the overheated vapor refrigerant generated by being heated in the heater 320 is prevented from flowing reversely to the gas-liquid separator 230.

Figure 5:
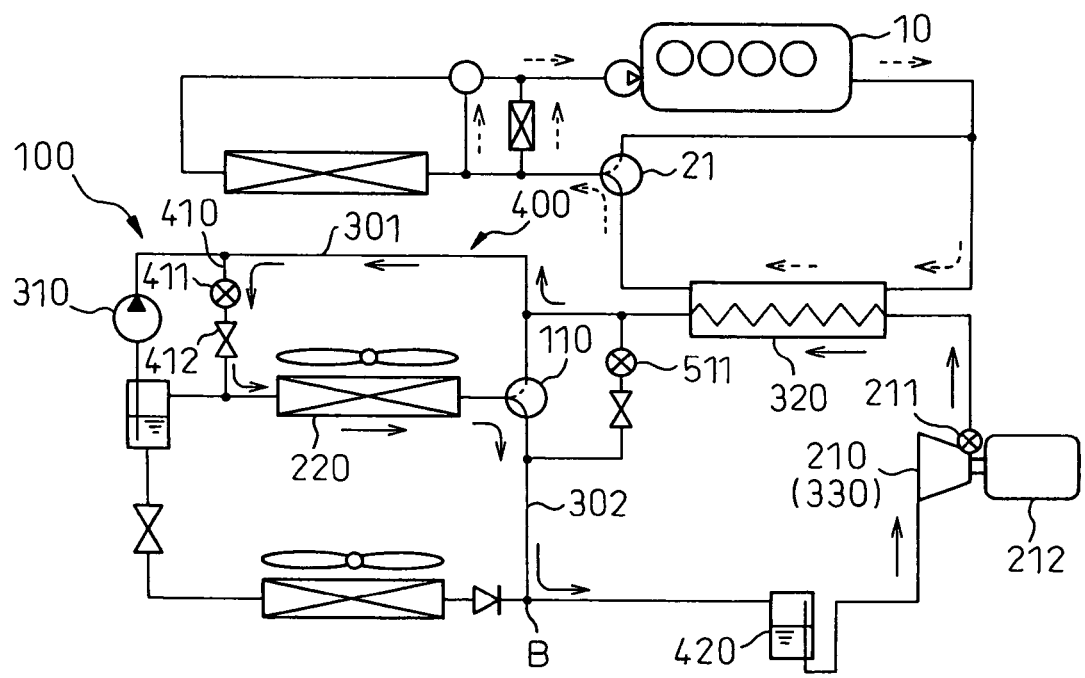
FIG. 5 is a schematic diagram showing the directions in which the engine cooling water and the refrigerant flow in heat pump warm-up mode in FIG. 1.

4. Heat Pump Warm-Up Mode (FIG. 5)

In this operation mode, in the case where the engine cooling water temperature is as low as immediately after starting the engine 10 and the cooler mode is not executed, the heat pump cycle 400 is started to positively heat the engine cooling water low in temperature.

Specifically, the cycle switch valve 110 is switched by a control unit not shown to connect the condenser 220 to the flow path including point B (second bypass 302). At the same time, the three-way valve 21 is switched so that the engine cooling water flows through the heater 320 and the control valve 211 functions as a discharge valve. Thus, the liquid pump 310 is stopped, and the on-off valve 411 is opened while the on-off valve 511 is closed. The rotary electric machine 212 is operated as a motor (rotated in forward direction), and the expander-integrated compressor 201 is operated as a compressor (210).

In the process, the refrigerant is circulated from the compressor 210 through the heater 320, the first bypass 301, the liquid pump bypass 410, the on-off valve 411, the restricting portion 412, the condenser 220, the cycle switch valve 110, the second bypass 302, the accumulator 420 and the compressor 210 in that order In the same way as at the time of executing the cooler plus warm-up mode, heat is exchanged between the refrigerant and the engine cooling water in the heater 320, and the engine cooling water is heated. Further, the refrigerant in the cycle is decompressed by the restricting portion 412, and evaporated by absorbing heat from the atmosphere in the condenser 220. The gas-phase refrigerant thus evaporated is separated into a gas and a liquid in the accumulator 420, and the gas-phase refrigerant returns to the compressor 210.

As described above, in the heat pump warm-up mode, the heater 320 functions as a heat emitter to radiate the heat of the refrigerant to the engine cooling water (engine 10) (engine cooling water heating function). Also, the condenser 220 functions as a heat-absorbing heat exchanger to absorb heat from the atmosphere into the refrigerant. The heating ability of the heater 320 corresponds to the work done by the compressor 210 and the heat absorbed by the condenser 220.

Figure 6:
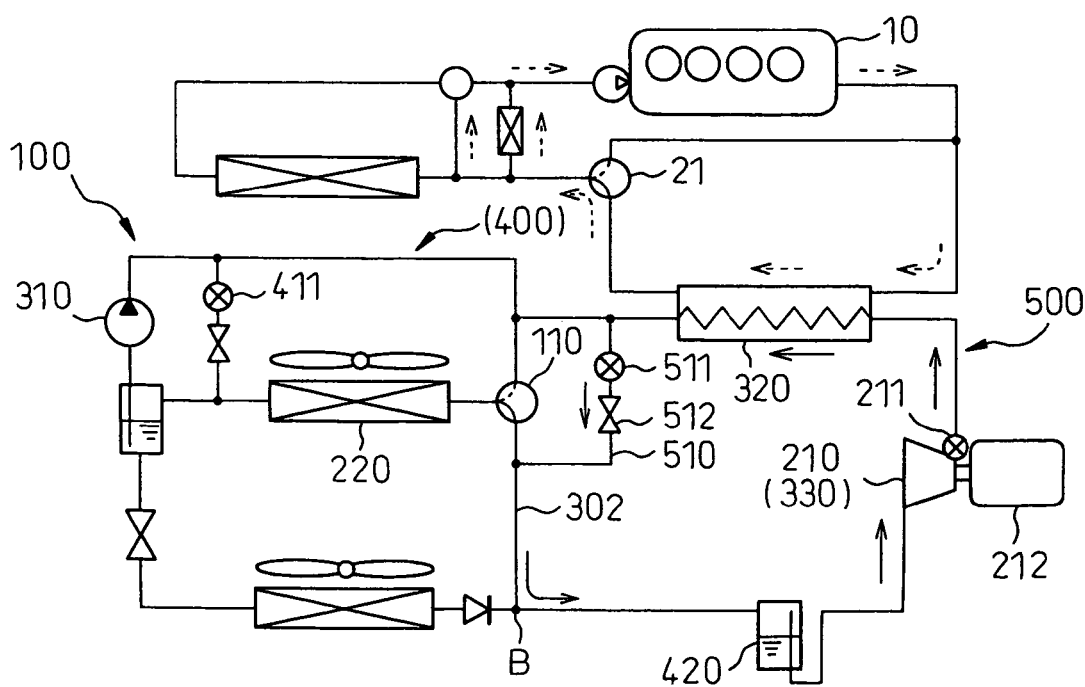
FIG. 6 is a schematic diagram showing the directions in which the engine cooling water and the refrigerant flow in hot gas warm-up mode in FIG. 1.

5. Hot Gas Warm-Up Mode (FIG. 6)

In this operation mode, in the case where the atmospheric temperature is so low (−10° C. or lower, for example) that the engine cooling water temperature is also as low as immediately after starting the engine 10 and the cooler mode is not executed, the hot gas cycle 500 is started instead of the heat pump cycle 400 thereby to positively heat the low-temperature engine cooling water.

Specifically, a control unit, not shown, switches the cycle switch valve 110 to connect the condenser 220 and the flow path including point B (second bypass 302). At the same time, the three-way valve 21 is switched so that the engine cooling water flows through the heater 320 and the control valve 211 functions as a discharge valve. Thus, the liquid pump 310 is stopped, and the on-off valve 411 is closed while the on-off valve 511 is opened. The rotary electric machine 212 is operated as a motor (rotated in forward direction) and the expander-integrated compressor 201 is operated as a compressor (210).

In the process, the refrigerant is circulated through the compressor 210, the heater 320, the switching path 510, the on-off valve 511, the restricting portion 512, the second bypass 302, the accumulator 420 and the compressor 210 in that order.

In the same way as at the time of executing the heat pump warm-up mode, heat is exchanged between the refrigerant and the engine cooling water in the heater 320 thereby to heat the engine cooling water. Further, the refrigerant in the cycle is decompressed in the restricting portion 512, and is separated into a gas and a liquid by the accumulator 420, and the gas-phase refrigerant returns to the compressor 210.

As described above, in the hot gas warm-up mode, the heater 320 functions as a heat emitter to radiate heat corresponding to the work done by the compressor 210 to the engine cooling water (engine 10) (engine cooling water heating function).

As described above, according to this embodiment, the condenser 220 of the refrigeration cycle 200 is shared by the Rankine cycle. In the case where the operation of the refrigeration cycle 200 is not required and sufficient heat (waste heat) is obtained from the engine 10, power can be recovered by the expander 330 and generated by operating the Rankine cycle 300. Thus, the waste heat of the engine 10 (thermal energy conventionally disposed of into the atmosphere as heat from the radiator 23) can be effectively utilized, and the fuel consumption efficiency of the engine 10 is improved.

Also, the heat pump cycle 400 is provided by utilizing the Rankine cycle 300. In the case where the operation of the refrigeration cycle 200 is not required and the engine 10 generates only a small amount of heat (waste heat), the heat pump cycle 400 is started. In this way, the engine cooling water (engine 10) can be heated through the heater 320 and the warm-up performance of the engine 10 is improved. In other words, the fuel consumption of the engine 10 is improved. Further, an insufficient ability of the heater core 26, using the engine cooling water as a heat source, can be compensated for.

Furthermore, the hot gas cycle 500 is formed of the switching path 510 having the compressor 210, the heater 320 and the restricting portion 512. Even in the case where the atmospheric temperature is very low, therefore, the engine cooling water (engine 10) can be heated through the heater 320 by starting the hot gas cycle 500 in place of the heat pump cycle 400, and thus the warm-up performance of the engine 10 is improved. In other words, the fuel consumption of the engine 10 is improved. Further, an insufficient ability of the heater core 26 using the engine cooling water as a heat source can be compensated for.

Further, a refrigerant path is formed to connect the heater 320 to the compressor 210 and the condenser 220. During the operation of the refrigeration cycle 200, when the engine 10 generates less heat, therefore, the high-temperature high-pressure refrigerant discharged from the compressor 210 can be supplied to the heater 320. The supply of the engine cooling water to the heater 320 can heat the engine cooling water (engine 10) through the heater 320, thereby improving the warm-up performance of the engine 10. In other words, the fuel consumption of the engine 10 is improved, and the shortage of ability of the heater core 26 can be compensated for.

In the process, the refrigerant flowing through the refrigeration cycle 200 is cooled (by heat radiation) also by the heater 320 as well as by the condenser 220. Thus, the refrigerant pressure can be reduced to lower the power of the compressor 210.

The compressor 210 and the expander 330 are combined into an expander-integrated compressor 201, and therefore a compact fluid machine is realized.

Also, the accumulator 420 is arranged on the suction side of the compressor 210. During the operation of the heat pump cycle 400 and the hot gas cycle 500, therefore, the liquid refrigerant is prevented from being absorbed into the compressor 210. Thus, the refrigerant is prevented from being compressed as a liquid.

Second Embodiment

Figure 7:
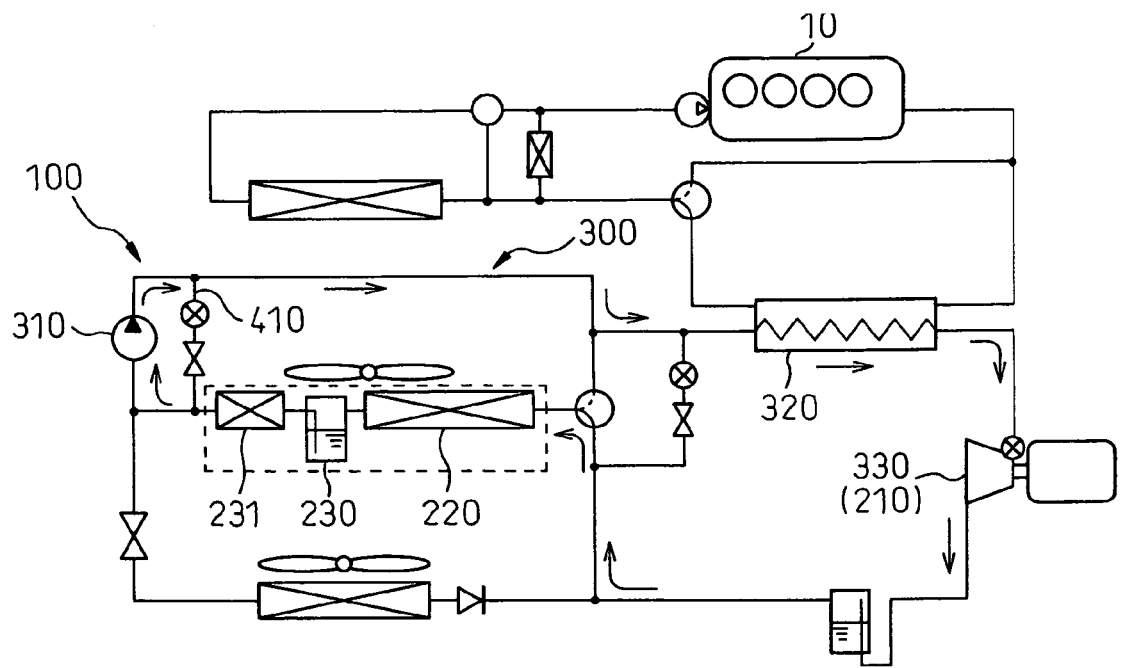
FIG. 7 is a schematic diagram showing a vapor compression refrigerator according to a second embodiment of the invention.

A second embodiment of the invention is shown in FIG. 7. In the second embodiment, the condenser 220 of the first embodiment is changed. Specifically, the condenser 220 assumes the form of a subcool condenser having what is called a gas-liquid separator with a gas-liquid separator 230 and a liquid refrigerant super-cooler 231 arranged in that order on the outlet side of the refrigerant during the operation of the Rankine cycle. The condenser 220, the gas-liquid separator 230 and the liquid refrigerant super-cooler 231 may be combined into a gas-liquid separator-integrated subcool condenser.

As a result, during the operation of the Rankine cycle 300, the liquid-phase refrigerant flowing out from the condenser 220 and separated by the gas-liquid separator 230 is further cooled by the liquid refrigerant super-cooler 231 and supplied to the liquid pump 310. Even in the case where the pressure is reduced (negative pressure) while the liquid pump 310 sucks in the refrigerant, the refrigerant is prevented from being boiled into a gas. Therefore, the damage to, and the reduction in pump efficiency of, the liquid pump 310, which otherwise might be caused by cavitation, are prevented.

In the second embodiment described above, the downstream side in the refrigerant flow through the liquid pump bypass 410 during the operation of the heat pump cycle 400 (FIG. 5) may be connected between the condenser 220 and the liquid refrigerant super-cooler 231, or more specifically, between the condenser 220 and the gas-liquid separator 230.

As a result, during the operation of the heat pump cycle 400, the refrigerant as a gas-liquid mixture from the heater 320 can flow into the condenser 220 without flowing through the liquid refrigerant super-cooler 231. Normally, the liquid refrigerant super-cooler 231 is less bulky and forms a narrower refrigerant path than the condenser 220. Therefore, the pressure loss during the flow of the gas-phase refrigerant increases. By preventing the refrigerant from flowing through the liquid refrigerant super-cooler 231 in this way, therefore, the pressure loss during the refrigerant flow is reduced while the heat pump cycle 400 is in operation.

Third Embodiment

Figure 8:
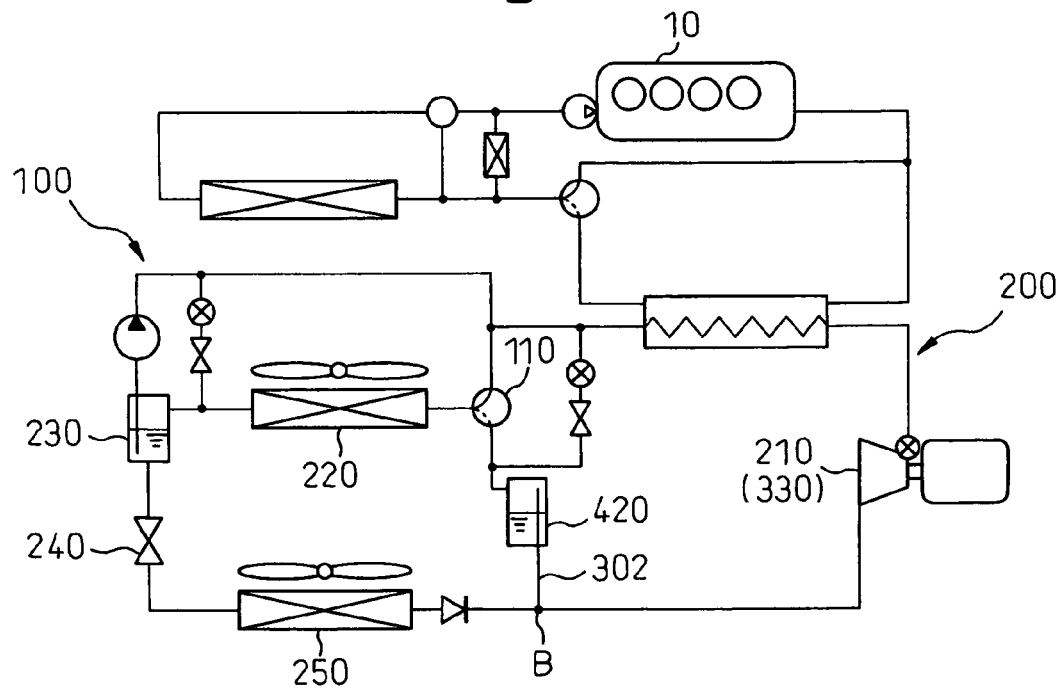
FIG. 8 is a schematic diagram showing a vapor compression refrigerator according to a third embodiment of the invention.

A third embodiment of the invention is shown in FIG. 8. In the third embodiment, the accumulator 420 is set at a position different from the first embodiment.

In this case, the accumulator 420 is arranged outside the refrigerant path during the operation of the refrigeration cycle 200 (while the evaporator 250 exhibits the refrigeration function). Specifically, the accumulator 420 is interposed between the cycle switch valve 110 and point B (second bypass 302).

As a result, the refrigerant is prevented from flowing through the accumulator 420 during the operation of the refrigeration cycle 200, thereby reducing the pressure loss during the refrigerant flow for an improved refrigeration ability.

Fourth Embodiment

Figure 9:
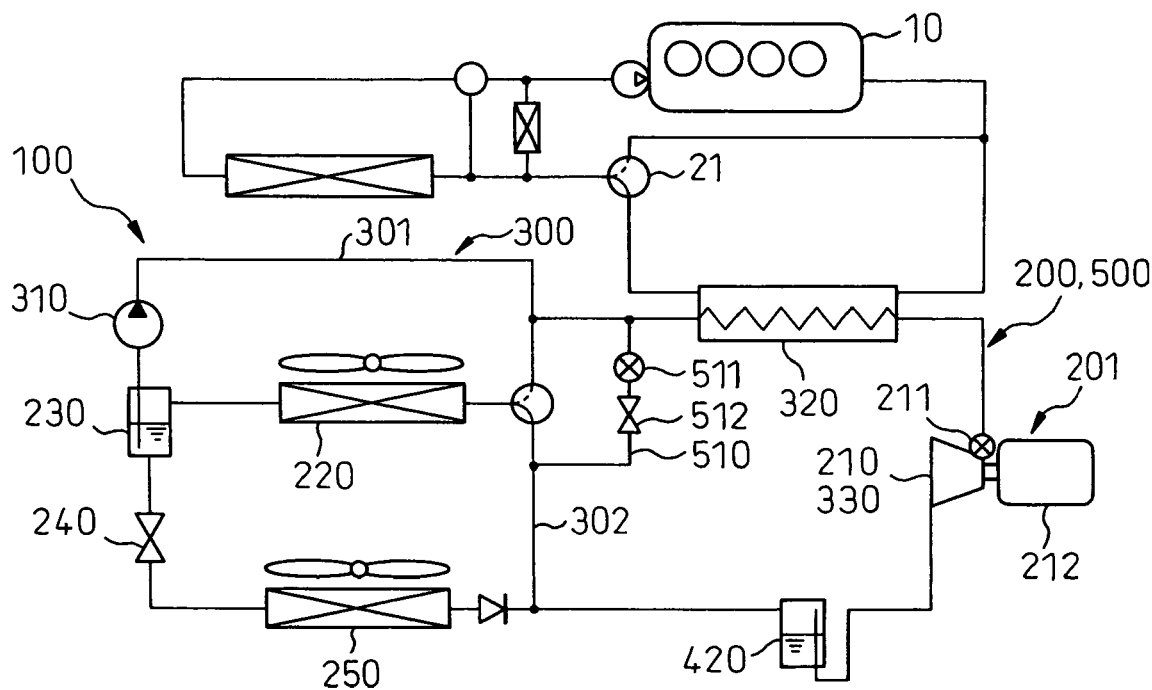
FIG. 9 is a schematic diagram showing a vapor compression refrigerator according to a fourth embodiment of the invention.

A fourth embodiment of the invention is shown in FIG. 9. The fourth embodiment represents a case in which the heat pump cycle 400 is eliminated from the first embodiment. Specifically, the liquid pump bypass 410, the on-off valve 411 and the restricting portion 412 are not used.

In the fourth embodiment, the engine cooling water at a low temperature is heated only by the hot gas cycle 500 (only the hot gas warm-up mode is executed).

As compared with the heat pump cycle 400, therefore, the elimination of the component devices (410, 411, 412) reduces the cost at the sacrifice of a lower heating ability of the hot gas cycle 500.

Fifth Embodiment

Figure 10:
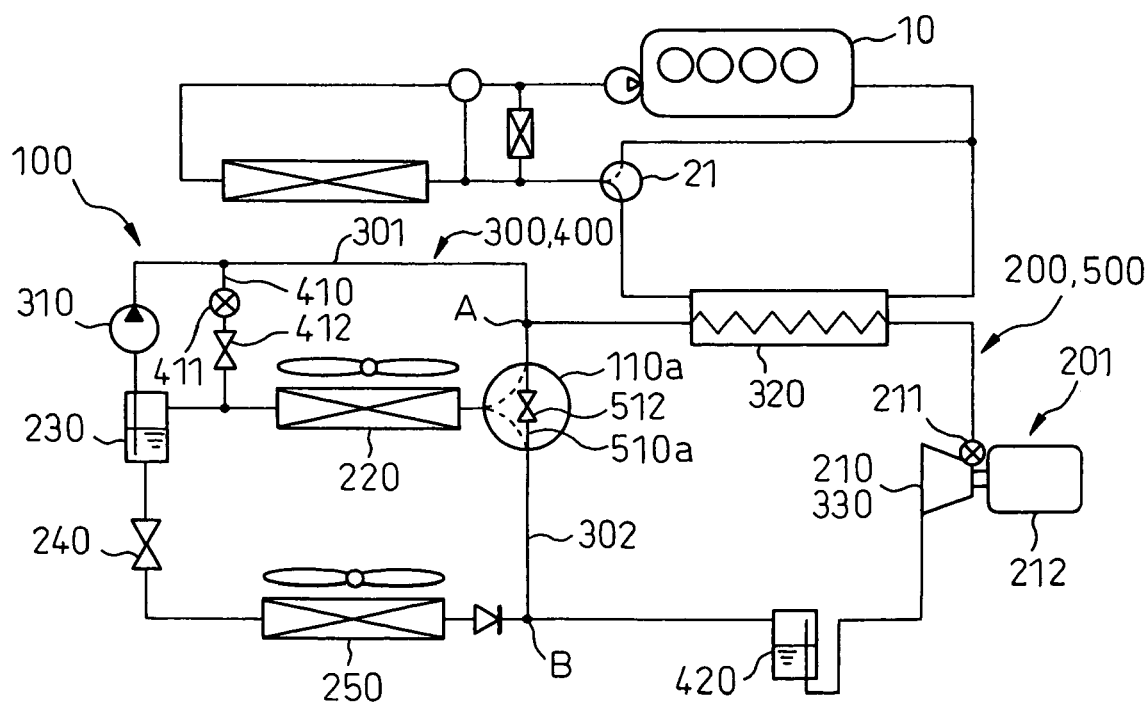
FIG. 10 is a schematic diagram showing a vapor compression refrigerator according to a fifth embodiment of the invention.

A fifth embodiment of the invention is shown in FIG. 10. In the fifth embodiment, as compared with the first embodiment, the switching path 510 is integrated with the cycle switch valve 110*a*.

In this case, the cycle switch valve 110*a*, including a path 510*a* having a restricting portion 512 connecting points A and B, is adapted to be turned on and off in addition to the paths including points A and B from the condenser 220.

In this way, a refrigerant path of a simple configuration can be formed.

In the first to fifth embodiments, the heat generating device is represented by the vehicle engine (heat engine, internal combustion engine) 10. This invention, however, is not limited to the vehicle engine, but is widely applicable to the external combustion engine, the fuel cell stack of the fuel cell powered vehicle, various motors and inverters which generate heat during operation and dispose of part of heat (as waste heat) for temperature control.

Also, in spite of the fact that the engine 10 cannot be warmed up (cooler plus warm-up mode) during the operation of the refrigeration cycle 200, the heater 320 may be arranged outside the refrigerant path connecting the compressor 210 and the condenser 220 of the refrigeration cycle 200 for the purpose of the warm-up operation of the engine 10 mainly by the heat pump cycle 400 or the hot gas cycle 500.

Further, the expander-integrated compressor 201 into which the compressor 210 and the expander 330 are combined may be replaced by the compressor 210 and the expander 330 as individual component parts.

In the first to fourth embodiments, the cycle switch valve 110 may be an on-off valve adapted to open and close the path including point A or the path including point B path, instead of the three-way valve.

Also, instead of storing the electrical energy in the capacitor by operating the rotary electric machine (generator) 212 with the driving force recovered by the expander 330, the mechanical energy may be stored as the kinetic energy of a flywheel or the elastic energy of a spring.

Furthermore, this invention is applicable to an automotive vehicle equipped with only a normal water-cooled engine as a drive source as well as to the hybrid car explained in the first to fifth embodiments above.

Sixth Embodiment

Figure 11:
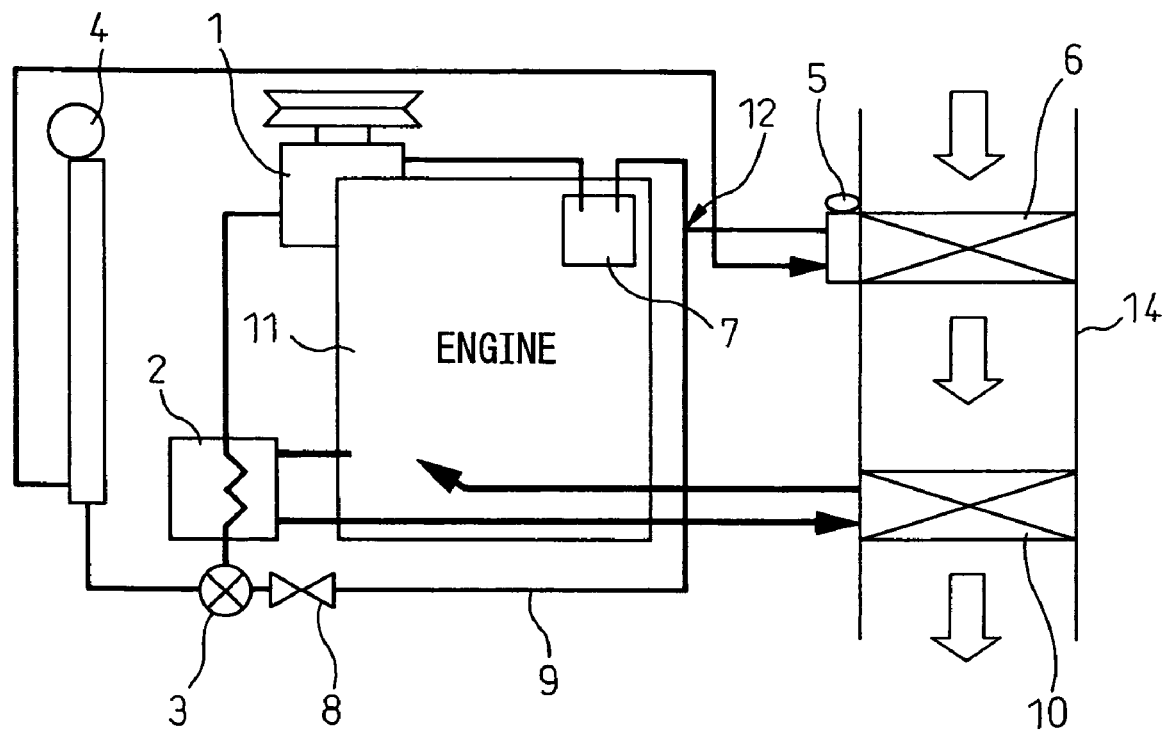
FIG. 11 is a schematic diagram showing a general configuration of an automotive climate control system according to a sixth embodiment of the invention.

An automotive climate control system according to a sixth embodiment of the invention is explained. FIG. 11 is a schematic diagram showing a general configuration of an automotive climate control system according to this embodiment of the invention. A compressor 1 is driven through a belt by a water-cooled vehicle engine 11 via an electromagnetic clutch (not shown).

The discharge side of the compressor 1 is connected to a high-pressure-side heat emitter (condenser) 4 through a water-refrigerant heat exchanger 2 described later and a switch valve 3 providing a switching means. The outlet of the high-pressure-side radiator 4 is connected to a low-pressure-side heat absorber (evaporator) 6 through an expansion valve 5 providing a first decompressor. Further, the outlet of the low-pressure-side heat absorber 6 is connected to the suction side of the compressor 1 through the accumulator 7. The accumulator 7 separates the liquid refrigerant and the gas refrigerant from each other and supplies the gas refrigerant to the compressor 1.

The high-pressure-side heat emitter 4 is arranged in the vehicle engine room together with the compressor 1, etc. and exchanges heat with the atmospheric air (cooling air) blown by an electric cooling fan (not shown) thereby to release heat. The low-pressure-side heat absorber 6, on the other hand, is arranged in the duct 14 of the automotive climate control system in which air flows toward the compartments, and thus the air flowing through the duct 14 is deprived of heat (heat absorption).

According to the sixth embodiment, a bypass 9 is formed to circumvent the high-pressure-side heat emitter 4 and connect the inlet of the switch valve 3 to the path 12 connecting the low-pressure-side heat absorber 6 and the accumulator 7. A restricting portion 8 providing a second pressure reducing means is arranged in the bypass 9. Also, a water-refrigerant heat exchanger 2 for exchanging heat between the engine cooling water and the refrigerant discharged from the compressor 1 is interposed between the compressor 1 and the switch valve 3.

The duct 14 of the automotive climate control system, on the other hand, includes therein a hot-water heater core 10 arranged downstream of the low-pressure-side heat absorber (evaporator) 6 in the air flow and providing a main heater to heat the blown air with the engine cooling water (hot water) from the vehicle engine 11 as a heat source, thereby forming a closed cooling water circuit between the engine 11 and the heater core 10. According to this embodiment, a water-refrigerant heat exchanger 2 is arranged in this closed cooling water circuit. In FIG. 11, the water-refrigerant heat exchanger 2 is arranged in the outgoing circuit (upstream of the heater core 10 in the cooling water flow) through which the cooling water is sent from the vehicle engine 11 to the heater core 10. As an alternative, the water-refrigerant heat exchanger 2 may be arranged in the incoming circuit (downstream of the heater core 10 in the cooling water flow) through which the cooling water is returned from the heater core 10 to the vehicle engine 11. In this way, heat is exchanged between the refrigerant discharged from the compressor 1 and the engine cooling water. This water-refrigerant heat exchanger 2, which can be of any of various types, is best formed as a double-tube heat exchanger.

The operation of the automotive climate control system according to the sixth embodiment having the above-mentioned configuration is explained. In the cooling operation, first, the operation mode is switched to the cooling mode by the switch valve 3. Then, the electromagnetic clutch is connected, and the compressor 1 is driven by the vehicle engine 11. The refrigerant discharged from the compressor 1 first flows into the water-refrigerant heat exchanger 2 to exchange heat with the engine cooling water. The refrigerant then passes through the switch valve 3 and flows into the high-pressure-side heat emitter (condenser) 4, where heat is released into the atmosphere thereby to cool and condense the refrigerant. The refrigerant, after passing through the high-pressure-side heat emitter 4, is decompressed by the expansion valve 5 into the dual phase of low-temperature low-pressure gas and liquid.

Next, the low-pressure refrigerant flows into the low-pressure-side heat absorber (evaporator) 6, and is evaporated by absorbing heat from the air-conditioning air flowing in the duct 14. The air-conditioning air cooled by the low-pressure-side heat absorber 6 is blown into and cools the passenger compartment. The gas refrigerant evaporated in the low-pressure-side heat absorber 6 is sucked into and compressed by the compressor 1 through the accumulator 7. Part of the air-conditioning air cooled by the low-pressure-side heat absorber 6 is separated by an air mix door not shown, and after being heated by the heater core 10 merges again with the remaining part of the air-conditioning air. In this way, the air-conditioning air is controlled to the optimum temperature and released into the compartments from each outlet.

As described above, during the cooling operation, a cooing refrigeration cycle is formed of a closed refrigerant circuit which, starting from the outlet of the compressor 1, is passed through the water-refrigerant heat exchanger, the switch valve (switching means) 3, the high-pressure-side heat emitter (condenser) 4, the expansion valve (first pressure reducing means) 5, the low-pressure-side heat absorber (evaporator) 6 and the accumulator 7 in that order and returns to the inlet of the compressor 1.

During the heating operation, on the other hand, the heating mode (hot gas mode) is entered through the switch valve 3. Once the compressor 1 is driven by the vehicle engine 11, the refrigerant discharged from the compressor 1 flows into the water-refrigerant heat exchanger 2 to exchange heat with the engine cooling water. As a result, the engine cooling water is heated so that the water-refrigerant heat exchanger 2 works as an auxiliary heater function. Next, the refrigerant flows into the bypass 9 from the switch valve 3, drops in pressure through the restricting portion 5, assumes the gas-liquid dual phase, and bypassing the low-pressure-side heat absorber (evaporator) 6, flows into the accumulator 7. From the accumulator 7, the gas refrigerant is sucked into and compressed by the compressor 1.

In this way, during the heating operation, a heating hot gas heater cycle is configured of a closed refrigerant circuit which, starting from the outlet of the compressor 1, passes through the water-refrigerant heat exchanger 2, the switch valve (switching means) 3, the restricting portion (second pressure reducing means) 8 and the accumulator 7 in that order, and returns to the inlet of the compressor 1.

Next, the operation effects of the automotive climate control system according to the sixth embodiment are explained. According to the sixth embodiment, in both the refrigeration cycle during the cooling operation and the heating gas hot gas heater cycle during the heating operation, heat is exchanged between the refrigerant discharged from the compressor 1 and the engine cooling water through the water-refrigerant heat exchanger 2. Also, in the heating hot gas heater cycle, the refrigerant bypasses both the high-pressure-side heat emitter (condenser) 4 and the low-pressure-side heat absorber (evaporator) 6. As a result, the operation effects described below are exhibited.

Figure 12:
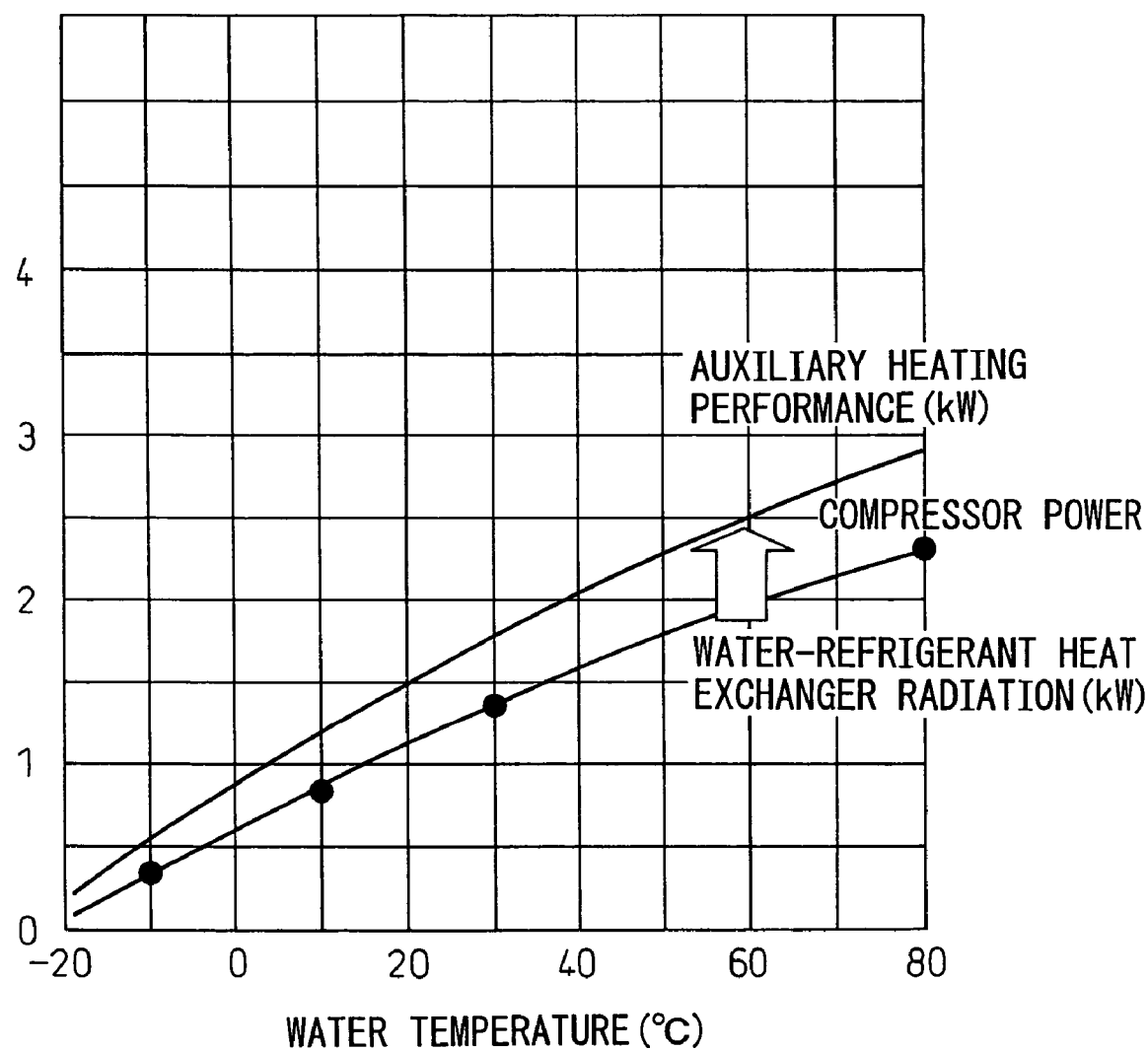
FIG. 12 is a graph showing the heating performance during the heating operation of the automotive climate control system according to the sixth embodiment.
Figure 13:
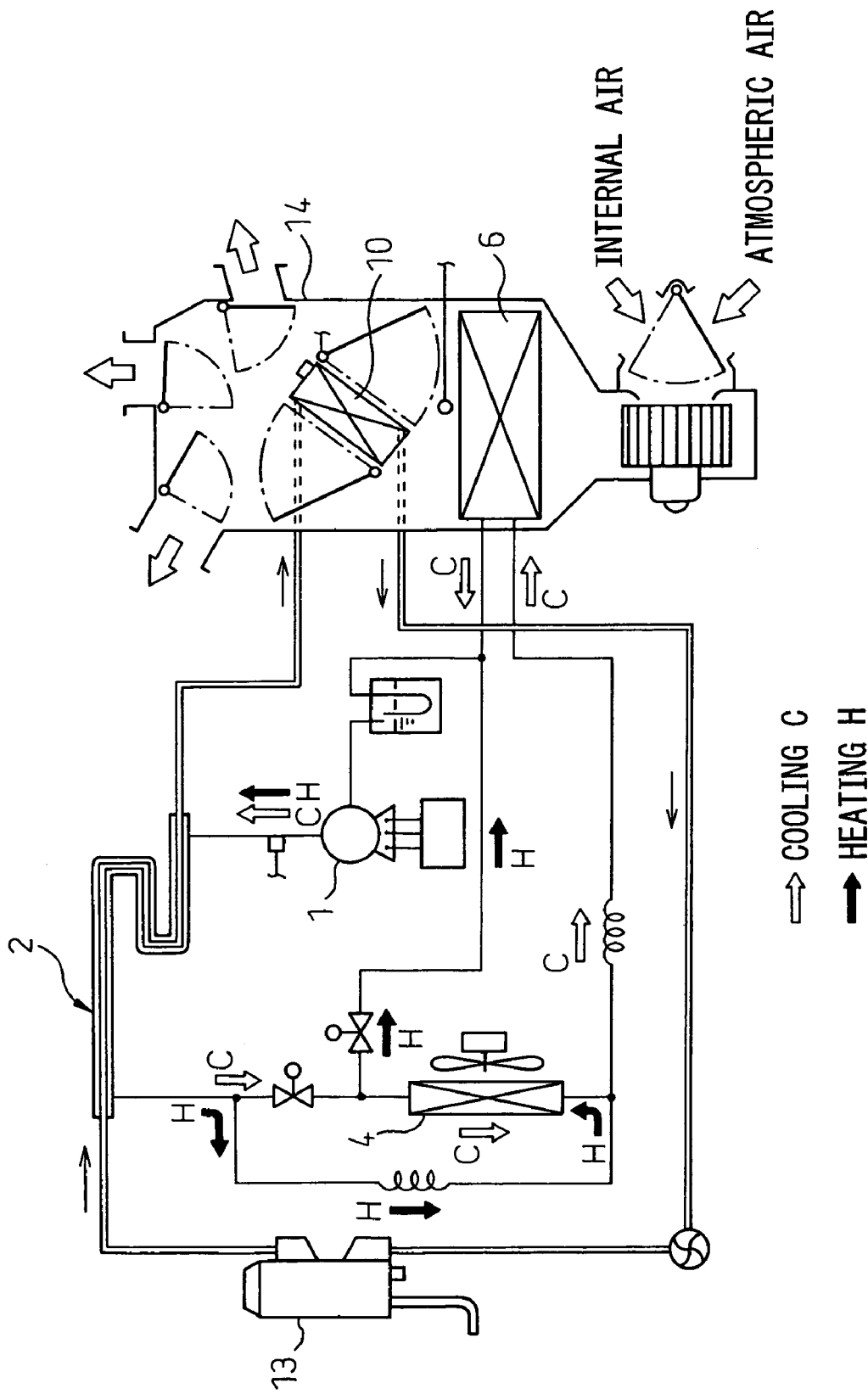
FIG. 13 is a diagram showing a general configuration of the conventional automotive climate control system of heat pump type.
Figure 14:
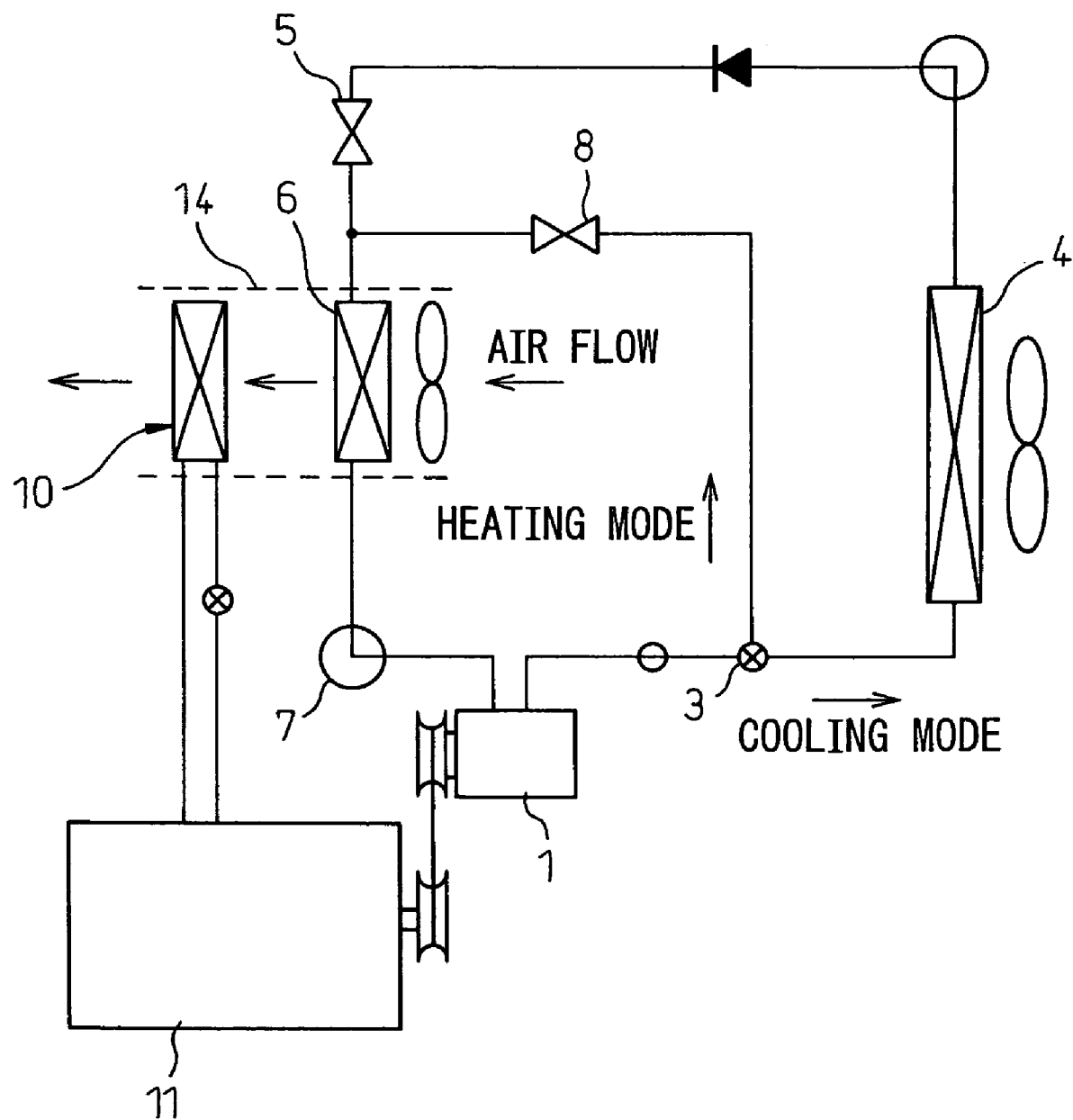
FIG. 14 is a diagram showing a general configuration of the conventional automotive climate control system using a hot gas cycle.

FIG. 12 is a graph showing the heating performance of the automotive climate control system in a heating operation according to this embodiment. The abscissa represents the engine cooling water temperature in ° C., and the ordinate the heating performance in kW. As can be understood from this graph, the pressure of the refrigerant discharged from the compressor 1 rises with the temperature of the engine cooling water and, therefore, the heating performance tends to improve. Thus, the total heating performance including the temperature increase of the engine cooling water by the compressor power reaches about 2.5 kW at water temperature of 60° C. While the atmospheric temperature is low, on the other hand, the heating performance is low. In other words, the heating performance is low only in the initial warm-up stage. The use of the engine cooling water, however, gradually improves the heating performance with the rise of the engine cooling water temperature. At an atmospheric temperature of −20° C., for example, the engine cooling water temperature rises from −20° C. to 10° C. in about two minutes.

As described above, according to this embodiment, the heating operation helps increase the engine cooling water temperature while the atmospheric temperature is low and thus can be used as an auxiliary heating operation to shorten the time before the temperature of the passenger compartment reaches a comfortable level.

As compared with the conventional hot gas heater as disclosed in Japanese Patent Publication No. 3237187, this invention has the following advantages:

(1) According to this embodiment, in the case where it is desired to early increase the temperature of the engine cooling water during the cooling-mode operation with the dehumidification function at the atmospheric temperature of about 0° C., for example, the discharged refrigerant passed through the water-refrigerant heat exchanger can be used as an auxiliary heater.

(2) During the cooling-mode operation with the dehumidification function at the atmospheric temperature of about 0° C., the auxiliary heating performance is conventionally suppressed to prevent the condensed water of the evaporator from being evaporated and fogging the window glass. According to this embodiment, on the other hand, the low-pressure-side heat absorber (evaporator) is bypassed and not used during the heating operation, and therefore the suppression of the auxiliary heating function is not required. Thus, the maximum auxiliary heating performance is always exhibited.

(3) Further, in the prior art, the sound of the flowing gas refrigerant is often heard in the passenger compartment during the heating operation. According to this embodiment, on the other hand, the refrigerant bypasses the low-pressure-side heat absorber and is not circulated in the passenger compartment. Therefore, the sound of the refrigerant flow is substantially not heard.

According to the sixth embodiment, the cooling operation has the following additional advantages:

(1) The temperature of the discharged refrigerant can be reduced while the engine is running at high speed. This is by reason of the fact that the engine cooling water temperature of about 80° C. compares with the compressor-discharged gas refrigerant temperature of about 120° C.

(2) In the initial stage of the cool down mode when the engine cooling water temperature is low, the cooling performance is improved.

While the invention has been described by reference to specific embodiments chosen for purposes of illustration, it should be apparent that numerous modifications could be made thereto, by those skilled in the art, without departing from the basic concept and scope of the invention.

The invention claimed is:

1. A vapor compression refrigerator wherein the refrigerant is sucked into and compressed by a compressor and circulated through a condenser, a pressure reducing device and an evaporator in that order while the evaporator exhibits the refrigeration function, comprising:
   a Rankine cycle where the refrigerant is circulated through a pump for discharging the refrigerant, a heater for heating the refrigerant with the waste heat of a heat generating device as a heat source, an expander and a condenser in that order, and power is recovered by the expander due to the expansion of the refrigerant from the heater; and
   a hot gas cycle where a switching path having a first restricting portion can connect a point between the pump and the heater and the suction side of the compressor, the refrigerant is circulated through the heater and the switching path in that order, and the heater exhibits the function of heating the heat generating device.

2. A vapor compression refrigerator according to claim 1, wherein the heat generating device is a heat engine.

3. A vapor compression refrigerator according to claim 1, further comprising a heater using the waste heat of the heat generating device as a heat source.

4. A vapor compression refrigerator according to claim 1, wherein the heater is arranged in the refrigerant path connecting the compressor and the condenser.

5. A vapor compression refrigerator according to claim 1, wherein the compressor functions as an expander when the refrigerant flowing out from the heater flows into the compressor.

6. A vapor compression refrigerator according to claim 1, wherein the condenser includes a gas-liquid separator for separating the refrigerant flowing out from the condenser into a gas-phase refrigerant and a liquid-phase refrigerant, and a liquid refrigerant super-cooler for supercooling the liquid-phase refrigerant flowing out from the gas-liquid separator as long as the Rankine cycle is working.

7. A vapor compression refrigerator according to claim 1, further comprising an accumulator in which while the hot gas cycle is working, the refrigerant is separated into a gas-phase refrigerant and a liquid-phase refrigerant at the inlet of the compressor, and the gas-phase refrigerant is supplied to the compressor.

8. A vapor compression refrigerator according to claim 7, wherein the accumulator is arranged displaced from the refrigerant path while the evaporator exhibits the refrigeration function.

9. A vapor compression refrigerator according to claim 1, further comprising a heat pump cycle in which a bypass having a second restricting portion can bypass the pump, the refrigerant is circulated through the heater, the bypass and the condenser in that order by the compressor so that the condenser exhibits the heat-absorbing function while the heater exhibits the function of heating the heat generating device.

10. A vapor compression refrigerator according to claim 1, used for a hybrid car including a drive power source having a heat engine as a heat generating device and a drive motor.

11. An automotive climate control system comprising:
   a main heater for heating the passenger compartment using the engine cooling water;
   a compressor;
   a high-pressure-side heat emitter connected to the outlet of the compressor;
   a low-pressure-side heat absorber connected to the inlet of the compressor and arranged upstream of the main heater in a duct for sending air into the compartments;
   a first pressure reducing means arranged at the inlet of the low-pressure-side heat absorber;
   an accumulator arranged in the path connecting the outlet of the low-pressure-side heat absorber and the inlet of the compressor;
   a switching means arranged in the path connecting the compressor and the high-pressure-side radiator;
   a bypass connected to the path leading from the inlet of the switching means to the low-pressure-side heat absorber and the accumulator by circumventing the high-pressure heat emitter;
   a second pressure reducing means arranged in the bypass; and
   a water-refrigerant heat exchanger arranged upstream of the main heater in the cooling water flow between the engine and the main heater to exchange heat between the refrigerant discharged from the compressor and the cooling water discharged from the engine;
   wherein, during the cooling operation, the refrigerant flows from the compressor through the water-refrigerant heat exchanger, the switching means, the high-pressure-side heat emitter, the first pressure reducing means, the low-pressure-side heat absorber and the accumulator in that order and returns to the compressor; and
   wherein, during the heating operation, the refrigerant from the compressor flows through the water-refrigerant heat exchanger, the switching means, the second pressure reducing means and the accumulator in that order and returns to the compressor, thereby bypassing the low-pressure heat absorber.

12. An automotive climate control system according to claim 11, wherein the water-refrigerant heat exchanger is arranged downstream instead of upstream of the main heater in the cooling water flow.

13. An automotive climate control system according to claim 11, wherein the compressor is driven by an engine.

* * * * *